Patented Mar. 29, 1932

1,851,204

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

COMPOUND FOR PURIFYING OILS

No Drawing. Application filed October 8, 1928. Serial No. 311,246.

This invention is a substance or compound for use in purifying oil.

In dealing with cotton seed oils, great difficulty is experienced in bleaching the oils sufficiently to appreciably remove the natural coloring matter contained therein. The object of the present invention is to produce a compound capable of bleaching cotton seed oils, and particularly the grade known as "prime summer yellow", so as to remove the coloring matter and produce a clear substantially uncolored oil. A further object is to provide a compound of the character described which may be quickly and easily produced and which can be manufactured at a low cost.

The invention will be hereinafter fully set forth and particularly pointed out in the claims.

The compound forming the subject matter of the invention consists of a mixture of calcium sulphate and clay. While it is preferred to use calcium sulphate as an ingredient either in the form of plaster of Paris or gypsum, the invention is not limited to this substance, because other calcareous cements may be employed in lieu thereof, such as pure calcium sulphate natural cement, Portland cement, and the like. Therefore, wherever the term "gypsum" is used in this specification and the appended claims, it is to be understood that the substances above mentioned are to be considered as equivalents thereof and within the spirit of the invention.

It is also to be understood that by the term "clay" as used herein is meant any of the clay or clay-like material well known in the art for filtering and bleaching oils. The different clays are known to vary somewhat in their chemical and physical characteristics, but all clays which are capable of filtering oil, or of bleaching the oil, or both, are considered to be within the spirit of this invention.

The two substances may be combined in any desired proportions, but excellent results have been obtained by using equal quantities of each.

In practice, a suitable quantity of the mixture of calcium sulphate and clay, depending upon the intensity of the coloring matter in the oil to be treated, is deposited into the oil, and then allowed to stand. The action of the substance is to quickly bleach out the coloring matter in the oil, the calcium sulphate apparently combining to some extent with the acid in the oil. It is to be understood, however, that this theory is more or less conjectural and is not intended to be binding or limiting. The significiant fact is that the compound when introduced into the oil does react upon the coloring matter in such a manner as to deposit impurities and bleach the oil. After the oil has been allowed to stand a sufficient time to complete the bleaching action, it may be separated from the bleaching compound in any suitable or desired manner. In lieu of depositing the compound in the oil, it may be used as part of the filter bed of a suitable filtering apparatus.

The advantages of the invention will be readily apparent to those skilled in the art to which it belongs. It will be particularly noted that a very simple and inexpensive compound has been produced, by means of which cotton seed oil may be readily bleached of coloring matter which ordinarily resists any other known method employed to eliminate it.

Having thus explained the nature of the invention and described an operative manner of constructing and using the same, although without attempting to set forth all of the forms in which it may be made, or all of the forms of its use, what is claimed is:—

1. A compound for purifying oils comprising a mixture of equal quantities of calcium sulphate and clay.

2. A compound for purifying oils consisting of a mechanical mixture of clay with a substantial quantity of extraneous gypsum existing independently of any chemical reaction upon said clay.

In testimony whereof I have hereunto set my hand.

HENRY H. MORETON.